US012789569B2

(12) United States Patent
Kim

(10) Patent No.: US 12,789,569 B2
(45) Date of Patent: Nov. 10, 2026

(54) VIBRATION CONTROL SYSTEM

(71) Applicants: Hyundai Motor Company, Seoul (KR); Kia Corporation, Seoul (KR)

(72) Inventor: Sang Rak Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 49 days.

(21) Appl. No.: 19/196,368

(22) Filed: May 1, 2025

(65) Prior Publication Data

US 2026/0158842 A1 Jun. 11, 2026

(30) Foreign Application Priority Data

Dec. 6, 2024 (KR) ........................ 10-2024-0180478

(51) Int. Cl.
*B60G 13/16* (2006.01)

(52) U.S. Cl.
CPC ........ *B60G 13/16* (2013.01); *B60G 2200/144* (2013.01); *B60G 2202/25* (2013.01); *B60G 2202/44* (2013.01); *B60G 2206/41* (2013.01); *B60G 2800/162* (2013.01)

(58) Field of Classification Search
CPC .... B60G 13/00; B60G 13/001; B60G 13/003; B60G 13/005; B60G 13/16; B60G 13/18; B60G 2200/14; B60G 2200/144; B60G 2200/1442; B60G 2202/20; B60G 2202/22; B60G 2202/25; B60G 2202/40; B60G 2202/44; B60G 2202/441; B60G 2202/442; B60G 2206/41; B60G 2800/162
USPC .................................................. 280/124.135
See application file for complete search history.

(56) References Cited

U.S. PATENT DOCUMENTS

| | | | |
|---|---|---|---|
| 7,316,303 | B2 | 1/2008 | Smith |
| 7,631,736 | B2 | 12/2009 | Thies et al. |
| 8,403,115 | B2 | 3/2013 | Gartner et al. |
| 9,074,652 | B2 | 7/2015 | Chen et al. |
| 9,334,914 | B2 | 5/2016 | Gartner |
| 10,378,607 | B2 | 8/2019 | Von Tardy-Tuch et al. |
| 10,508,439 | B2 | 12/2019 | Watanabe et al. |
| 10,808,789 | B2 | 10/2020 | Fox et al. |
| 10,883,558 | B2 | 1/2021 | Isoda et al. |
| 11,065,931 | B1 | 7/2021 | Keas et al. |
| 11,078,981 | B2 | 8/2021 | Zhang et al. |
| 11,180,240 | B2 | 11/2021 | Fox |

(Continued)

FOREIGN PATENT DOCUMENTS

| | | | |
|---|---|---|---|
| CN | 110778672 | A | 2/2020 |
| CN | 109630597 | B | 11/2020 |

(Continued)

*Primary Examiner* — Daniel M. Keck
(74) *Attorney, Agent, or Firm* — Slater Matsil, LLP

(57) ABSTRACT

In embodiments a vibration control system is disclosed. The vibration control system includes a housing disposable between left and right wheels of a vehicle and a rotational inertial element configured to rotate within the housing, a pair of converters connectable to the vehicle's left and right wheels, respectively, and configured to convert up-and-down motion of the wheels into linear motion, and connecting rods connecting the pair of converters to the rotational inertial element and to configured to convert the linear motion of the converters into rotational motion of the rotational inertial element.

20 Claims, 11 Drawing Sheets

(56) References Cited

U.S. PATENT DOCUMENTS

| | | | | |
|---|---|---|---|---|
| 2007/0205041 | A1* | 9/2007 | Nishizaki | B62D 5/0472 180/446 |
| 2009/0108510 | A1 | 4/2009 | Wang et al. | |
| 2009/0139225 | A1 | 6/2009 | Wang et al. | |
| 2013/0032442 | A1 | 2/2013 | Tuluie | |
| 2014/0190778 | A1 | 7/2014 | Gartner | |
| 2014/0361502 | A1* | 12/2014 | Kitamura | B60G 13/16 280/5.515 |
| 2015/0165855 | A1* | 6/2015 | Yu | B60G 17/0162 280/5.508 |
| 2015/0167773 | A1 | 6/2015 | Gartner et al. | |
| 2015/0224845 | A1* | 8/2015 | Anderson | F03G 7/081 701/37 |
| 2019/0315450 | A1 | 10/2019 | Fox et al. | |
| 2023/0278386 | A1* | 9/2023 | Hall | B60G 17/052 280/6.157 |
| 2024/0300275 | A1* | 9/2024 | Anderson | H02K 7/14 |
| 2024/0426273 | A1 | 12/2024 | Couturier et al. | |

FOREIGN PATENT DOCUMENTS

| | | | | |
|---|---|---|---|---|
| CN | 112128313 | A | 12/2020 | |
| CN | 111089135 | B | 6/2021 | |
| CN | 111251889 | B | 6/2021 | |
| CN | 111457046 | B | 9/2021 | |
| CN | 113389836 | A | 9/2021 | |
| CN | 113602051 | A | 11/2021 | |
| CN | 111946764 | B | 3/2022 | |
| CN | 116241594 | A | 6/2023 | |
| DE | 102012221976 | A1 | 6/2014 | |
| EP | 2528757 | A1 | 12/2012 | |
| EP | 4112968 | A1 | 1/2023 | |
| TW | I321619 | B | 3/2010 | |
| TW | I321620 | B | 3/2010 | |
| WO | WO-9930915 | A1 * | 6/1999 | B60G 13/005 |

* cited by examiner

VIBRATION CONTROL SYSTEM

CROSS-REFERENCE TO RELATED APPLICATIONS

This application is based on and claims priority under 35 U.S.C. 119 to Korean Patent Application No. 10-2024-0180478, filed on Dec. 6, 2024, in the Korean Intellectual Property Office, the disclosure of which is herein incorporated by reference in its entirety.

TECHNICAL FIELD

The present disclosure relates to a system for controlling vibrations using a rotational inertial element in a dual-rod or single-rod-type inerter device.

BACKGROUND

A vehicle suspension system plays a critical role in absorbing impacts caused by road surface irregularities and enhancing ride comfort of the vehicle. In particular, the performance of a suspension system is closely linked to the vehicle's driving stability, ride comfort, and noise and vibration control. Traditionally, suspension system controls a vehicle's movement through the interaction of components such as springs, dampers, and bushings. However, there are limitations in effectively controlling persistent small vibrations that occur in the high-frequency range. These high-frequency vibrations may degrade a vehicle's ride comfort, and thus require effective solutions.

An inerter is a device designed to control such vibrations, fundamentally converting relative acceleration between two points into force. It was first developed in 2001 by Professor M. C. Smith of Cambridge and has primarily been used as a seismic damper for buildings. Subsequently, it was applied to vehicles by McLaren's Formula 1 Team under the name "J-DAMPER", but it is currently not used due to regulatory restrictions. Existing inerter systems have mainly been implemented mechanically using mass-ball-screw or fluid-based structures, and some systems with composite functionalities also exist. However, these systems have been effective only under specific conditions and have shown limitations in optimizing the propagation of high-frequency vibrations.

To further enhance the performance of suspension systems, technology capable of converting the up-and-down motion of the suspension into rotational motion is necessary. This conversion plays an important role in increasing the unsprung mass of the suspension, thereby reducing the transmission rate of vibrations in the high-frequency range. The existing single-rod inerter systems had limitations in that they could only control the movement of one side of the suspension. To solve this problem, a dual-rod system, which independently connects the left and right suspensions, has been considered. This system enables the effective implementation of a mechanism that converts vertical motion into rotational motion.

In response to such technical requirements, a novel device applicable to suspension systems is needed. This device may more effectively control high-frequency vibrations and isolate vibrations transmitted to the vehicle body by converting the suspension's up-and-down motion into rotational motion. Such technology improves a vehicle's ride comfort and plays an important role in maintaining stable driving performance even at high speeds. Moreover, this technology may strengthen the linkage between the vehicle body and the suspension by further optimizing the suspension system's performance to control high-frequency vibrations.

The above information disclosed in this section is only for enhancement of understanding of the background of the disclosure and therefore it may contain information that does not form the prior art as defined by the patent statute.

SUMMARY

Embodiments provide a vibration control system that enhances a vehicle's ride comfort by effectively controlling vibrations such as high-frequency vibrations, using a suspension device configured with a dual-rod or single-rod-type inerter.

Embodiments may not be limited to the above-mentioned technical subjects, and other technical subjects which are not mentioned may be clearly understood from the following descriptions by those skilled in the art to which the present disclosure pertains.

Embodiments provide a vibration control system including: a housing disposed between left and right wheels of a vehicle and a rotational inertial element configured to rotate within the housing; a pair of converters provided to be connected to the vehicle's left and right wheels, respectively, and configured to convert up-and-down motion of the wheels into linear motion; and connecting rods configured to connect the pair of converters to the rotational inertial element and to convert the linear motion of the converters into rotational motion of the rotational inertial element.

In the vibration control system of the present disclosure, the housing may be installed on a subframe connected to a vehicle body, the subframe may be located between a sprung mass and an unsprung mass, and an effective unsprung mass may increase in response to the rotation of the rotational inertial element.

In the vibration control system of the present disclosure, the converters may each include a connecting arm configured to rotate in a left-right direction and a rotational joint coupled to the connecting arm and configured to move up and down.

In the vibration control system of the present disclosure, the connecting arm may rotate about a rotational center, and the rotational center may be provided on the subframe connected to the vehicle body.

In the vibration control system of the present disclosure, one end of the connecting arm, which is connected to the wheel, may extend to be connected to the rotational center, and another end may extend from the rotational center to be bent upward, with the rotational joint coupled to another end of the connecting arm.

In the vibration control system of the present disclosure, the connecting arm may be configured such that the one end moves up and down about the rotational center, while another end rotates in a left-right direction, and the rotational joint moves up and down in response to the rotation of another end in the left-right direction.

In the vibration control system of the present disclosure, the connecting rods may be coupled to the converters via heads, respectively, and may be screw-coupled to the rotational inertial element to connect the converters and the rotational inertial element.

In the vibration control system of the present disclosure, the connecting rods may be screw-coupled to the rotational inertial element via a ball screw mechanism, the heads may perform left-right motion in response to the linear motion of the converters, and the rotational inertial element may be rotated as the ball screw is rotated in response to the left-right motion of the converters.

In the vibration control system of the present disclosure, the heads may perform left-right motion by sliding in a direction toward or away from the housing in response to the linear motion of the converters.

In the vibration control system of the present disclosure, the connecting rods may include a pair of connecting rods, a left connecting rod is positioned on a left side of the rotational inertial element and is connected to a left converter, and a right connecting rod may be positioned on a right side of the rotational inertial element and may be connected to a right converter.

In the vibration control system of the present disclosure, the left connecting rod may be elastically supported by the left end of the housing and may be inserted into and screw-coupled to the rotational inertial element.

In the vibration control system of the present disclosure, the right connecting rod may be elastically supported by the right end of the housing, and the rotational inertial element may be inserted into and screw-coupled to the right connecting rod.

In the vibration control system of the present disclosure, the left connecting rod and the right connecting rod may be aligned with the rotational inertial element, and the rotational inertial element may rotate in response to rotational motion of the left connecting rod or the right connecting rod.

In the vibration control system of the present disclosure, the rotational inertial element may be fixed to the housing via a sliding member or slider, and the left connecting rod and the right connecting rod may rotate independently relative to the rotational inertial element.

In the vibration control system of the present disclosure, the left and right wheels of the vehicle may be connected to the suspensions, respectively, and in response that the suspensions undergo a bump, the connecting rods may move toward the rotational inertial element, and in response that the suspensions undergo a rebound, the connecting rods may move away from the rotational inertial element.

In the vibration control system of the present disclosure, in response that the vehicle turns left, the left connecting rod may move away from the rotational inertial element while the right connecting rod may move toward the rotational inertial element, and in response that the vehicle turns right, the left connecting rod may move toward the rotational inertial element while the right connecting rod may move away from the rotational inertial element.

In the vibration control system of the present disclosure, a single connecting rod may be provided, the single connecting rod may be connected to either the left or the right converter, and the rotational inertial element may be screw-coupled to one side of the connecting rod and connected to the converter at another side.

In the vibration control system of the present disclosure, the rotational inertial element may be coupled to the converter via a head at another side, and the head may slide in a direction toward or away from the housing as the rotational inertial element moves toward or away from the connecting rod.

In the vibration control system of the present disclosure, the left and right wheels of the vehicle may be connected to the suspensions, respectively, in which, in response that the suspensions undergo a bump, the rotational inertial element and the connecting rod may move closer to each other, and in response that the suspensions undergo a rebound, the rotational inertial element and the connecting rods move away from each other.

In the vibration control system of the present disclosure, in response that the vehicle turns left, the left suspension may undergo a rebound and the right suspension may undergo a bump, causing the rotational inertial element and the connecting rods to move toward the left, and in response that the vehicle turns right, the left suspension may undergo a bump and the right suspension may undergo a rebound, causing the rotational inertial element and the connecting rods to move toward the right.

With the vibration control system of the present disclosure, the up-and-down motion of the suspensions can be converted into rotational motion, thereby reducing the transmission of high-frequency vibrations and improving the vehicle's ride comfort.

Advantageous effects obtainable from the present disclosure may not be limited to the above-mentioned effects, and other effects which are not mentioned may be clearly understood from the following descriptions by those skilled in the art to which the present disclosure pertains.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF ILLUSTRATIVE EMBODIMENTS

Figure 1:
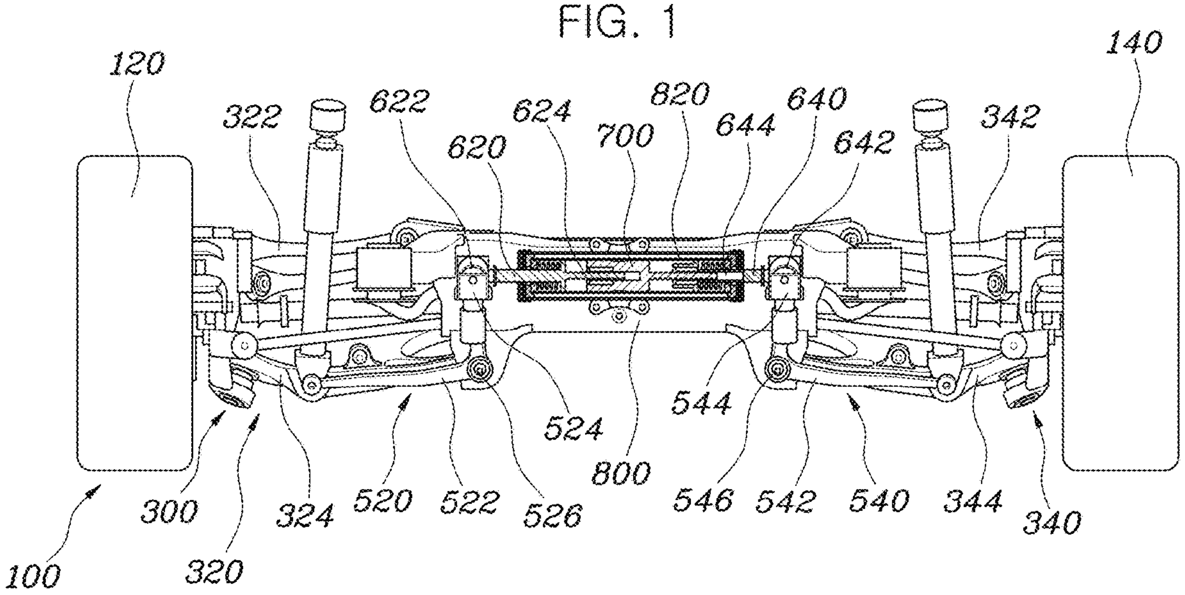
FIG. 1 is a view illustrating a dual-rod type vibration control system according to an embodiment of the present disclosure.

In describing the embodiments set forth herein, a detailed description of known functions or configurations incorporated herein will be omitted when it is determined that the description may make the subject matter of the embodiments set forth herein unclear. In addition, it should be appreciated that the accompanying drawings are provided only for the sake of easy understanding of the embodiments set forth herein, and the technical idea of the present disclosure is not limited to the accompanying drawings and includes all modifications, equivalents, or alternatives falling within the spirit and scope of the present disclosure. The disclosure herein is not intended to limit the present disclosure to the described forms or specific fields. It is contemplated that various alternative embodiments and modifications of the present disclosure are possible whether explicitly set forth or implied herein. A person ordinarily skilled in the art to which the present disclosure pertains will recognize that the form and details of the present disclosure may be modified.

The present disclosure will be described with reference to specific embodiments. However, as understood by a person ordinarily skilled in the art, the various aspects disclosed herein may be modified or otherwise implemented in different ways without departing from the spirit and scope of the present disclosure. Accordingly, the following description is to be considered exemplary, and is intended to teach those ordinarily skilled in the art how to make and use various embodiments. It is to be understood that the forms of the disclosure illustrated and described herein are exemplary embodiments. Equivalent elements, materials, processes, or steps may be substituted for those exemplified and described in the present disclosure. Expressions used in this disclosure, such as "including", "comprising", "incorporating", "consisting of", "having", or "is", should be interpreted in a non-exclusive manner, i.e., to allow for the inclusion of items, components, or elements not explicitly listed. In addition, references to the singular form should be interpreted to include the plural form as well.

Furthermore, the various embodiments disclosed herein should be regarded as exemplary and descriptive, and should not be construed as limiting the scope of the present disclosure. All references to joining (e.g., attached, affixed, coupled, and connected) are used solely to facilitate understanding of the present disclosure and are not intended to limit the position, orientation, or use of any component or method disclosed herein. Accordingly, references to joining should be interpreted broadly. Moreover, these references to joining do not imply that two or more elements are directly connected to each other. That is, these terms may be used to describe various components but should not be construed as limiting the components to those terms. These terms are used only to distinguish one component from another.

The terms "module" and "unit" used for the elements in the following description are given or interchangeably used in consideration of only the ease of writing the specification, and do not have distinct meanings or roles by themselves.

In the case where an element is referred to as being "connected" or "coupled" to any other elements, it should be understood that not only the element may be directly connected or coupled to the other elements, but also another element may exist therebetween. Contrarily, in the case where an element is referred to as being "directly connected" or "directly coupled" to any other element, it should be understood that no other element exists therebetween.

Any number or variety of components in any of the configurations described herein may be included within the scope of the present disclosure described herein. The components may include any combination of the features described herein and may be arranged in any of the various configurations described herein. The concepts related to the structure and arrangement of the components of the present disclosure, as well as their use and operation, may be applied to any number of embodiments in any combination, as well as to the specific embodiments discussed herein. Embodiments including those having various features in various arrangements are described below with reference to the drawings.

Figure 2:
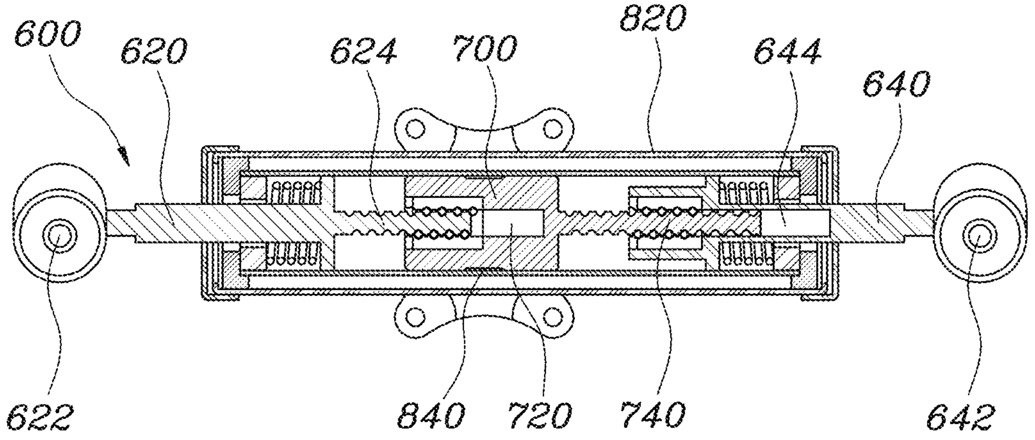
FIG. 2 is a view illustrating the coupling relationship of a rotational inertial element in the dual-rod type vibration control system illustrated in FIG. 1 according to an embodiment of the present disclosure.
Figure 7:
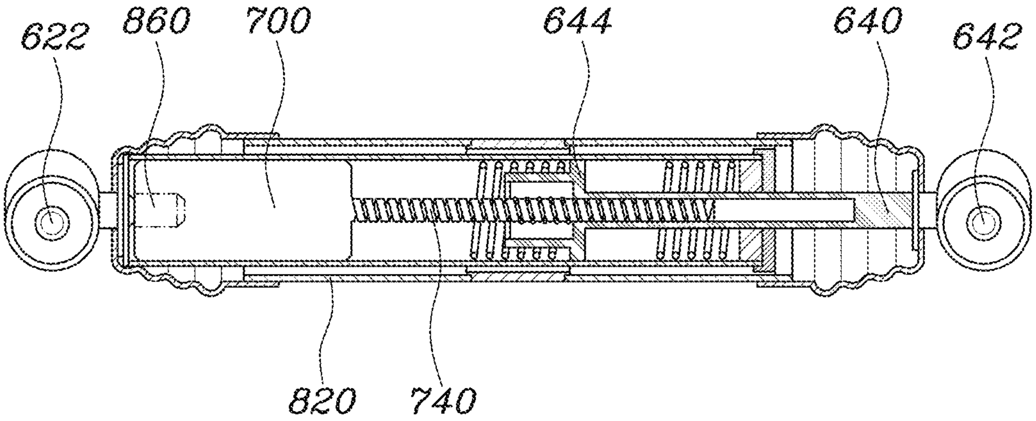
FIG. 7 is a view illustrating a single-rod type vibration control system according to an embodiment of the present disclosure.

FIG. 1 is a view illustrating a dual-rod type vibration control system according to an embodiment of the present disclosure. FIG. 2 is a view illustrating the coupling relationship of a rotational inertial element in the dual-rod type vibration control system illustrated in FIG. 1 according to an embodiment of the present disclosure. FIGS. 3 to 6 are views illustrating the operational states of the dual-rod type vibration control system illustrated in FIG. 1 in response to a suspension's bump or rebound according to an embodiment of the present disclosure. FIG. 7 is a view illustrating a single-rod type vibration control system according to an embodiment of the present disclosure. FIGS. 8 to 11 are views illustrating the operational states of the single-rod type vibration control system illustrated in FIG. 7 in response to a suspension's bump or rebound according to an embodiment of the present disclosure.

Hereinafter, embodiments set forth herein will be described in detail with reference to the accompanying drawings, and the same or similar elements are given the same and similar reference numerals regardless of figure numbers, so duplicate descriptions thereof will be omitted.

A vehicle suspension system plays an important role in protecting the vehicle from road irregularities and enhancing ride comfort. However, existing suspension systems have difficulty in effectively controlling high-frequency vibrations, which may result in degraded ride comfort and the transmission of vibrations to the vehicle body during high-speed driving. To solve these problems, inerter technology may be applied. The technology converts a suspension's up-down motion into rotational motion, ensuring effective control of vibration energy. While existing traditional single-rod systems could control vibrations only along one axis, dual-rod inerter systems independently connect the left and right suspensions and convert the suspension's up-and-down motion into rotational motion, thereby insulating the transmission of high-frequency vibrations from the vehicle body and improving the vehicle's ride comfort and driving performance.

Embodiments provide a vibration control system that enhances a vehicle's ride comfort by effectively controlling vibrations, such as high-frequency vibrations, using a suspension device configured with a dual-rod or single-rod-type inerter.

Specifically, with reference to FIGS. 1 and 2, a dual-rod-type vibration control system according to an embodiment of the present disclosure will be described.

In an embodiment, the vibration control system may include a rotational inertial element 700, a pair of converters 520/540, and connecting rods 600. More specifically, the rotational inertial element 700 may respond to the up-and-down motion of a suspension system through rotational motion. In addition, a suspension 300 is positioned on either side of the rotational inertial element 700 and is connected to a left wheel 120 or the right wheel 140, thereby moving up and down in response to the movement of the wheels 100. The pair of converters 520/540 may be provided to be connected to the left wheel 120 and the right wheel 140, respectively, to convert the up-and-down motion of the wheels 100 into linear motion. The connecting rods 620 and 640 link the pair of converters 520 and 540 with the rotational inertial element 700 to convert the linear motion of the converters 520/540 into rotational motion of the rotational inertial element 700. As the rotational inertial element 700 rotates, the vibrations generated by the up-and-down motion of the wheels 100 are damped, and then these vibrations are transmitted to the vehicle body 200, thereby effectively damping the vibrations transmitted to the vehicle body 200.

In an embodiment, the rotational inertial element 700 may represent a physically rotating mass within an inerter system. The rotational inertial element 700 may be designed in the form of a circular disk, a ring, a sphere, or other mass form and may convert vertical impacts or vibrations experienced by the suspension 300 into rotational motion. Specifically, by converting up-and-down vibrations into rotational motion, the effective increase in the suspension system's unsprung mass reduces vibrations in the high-frequency range, thereby improving the vehicle's ride comfort.

In an embodiment, the rotational inertial element 700 has a fixed mass and may rotate due to relative acceleration. The rotational motion generated by the rotation of the rotational inertial element 700 effectively absorbs the up-and-down vibrations of the suspension and prevents high-frequency vibrations from being transmitted to the vehicle body. In addition, the rotational inertial of the rotational inertial element 700 is determined by its size, mass, and axis of rotation. Various shapes of the rotational inertial element 700 may be applied without being limited to the illustrated examples.

In an embodiment, the rotational inertial element 700 may reduce the transmission rate of the unsprung mass in the suspension system and perform vibration control through efficient coupling with the sprung mass. That is, as the up-and-down motion of the wheels 100 is converted into rotational motion, the unsprung mass may effectively increase, allowing vibrations in the high-frequency range to be controlled. Since high-frequency vibrations significantly affect ride comfort, their control may become particularly important during high-speed driving.

In an embodiment, the suspensions 300 may connect the vehicle body 200 and the wheels 100 to control the vehicle's movements and absorb vibrations. The suspensions 300 may perform various types and trajectories of motion, including up-and-down motion, forward-rearward motion, and left-right motion, and may absorb irregularities or impacts from a road surface, reducing the forces transmitted to the vehicle body. That is, the suspensions 300 may enhance the vehicle's stability by adjusting their effective mass and enhancing their structural efficiency.

In an embodiment, the suspensions 300 may be made of a material such as steel, aluminum, or an alloy thereof. Due to the importance of rigidity, it may be desirable to manufacture the suspensions from a metallic material. In addition, the suspensions 300 may be designed as independent suspensions, allowing respective wheels to move independently. In addition, a double-wishbone suspension composed of two wishbone-shaped links or a MacPherson strut suspension in which a spring and a stabilizer are coupled may be applied. Furthermore, various suspensions, such as torsion beam suspensions or multi-link suspensions, may also be applied.

In an embodiment, a housing 820 is installed on a subframe 800 connected to the vehicle body 200. The subframe 800 may be located between the sprung mass and the unsprung mass, and the effective unsprung mass may increase as the rotational inertial element 700 rotates. Here, the sprung mass may refer to the upper mass of the vehicle supported by the suspensions 300, while the unsprung mass refers to the lower mass of the vehicle not supported by the suspensions 300. Accordingly, as the rotational inertial element 700 rotates, the effective unsprung mass may increase, thereby damping vibrations caused by up-and-down motion.

In an embodiment, the up-and-down vibrations generated by the left wheel 120 or the right wheel 140 may correspond to high-frequency vibrations. The rotational inertial element 700 may damp high-frequency vibrations through its rotational motion. That is, as the up-and-down motion of the wheels 100 and suspensions 300 is converted into rotational motion by the rotational inertial element 700, it has the effect of increasing the unsprung mass, which may lower the transmission rate of the high-frequency unsprung mass. In this case, while the low-frequency sprung mass increases, it may be compensated for by the components of the suspensions 300, such as springs, dampers, and bushings.

In an embodiment, the converters 520/540 may include connecting arms 522 and 542 and rotational joints 524 and 544, respectively. In this case, the connecting arms 522 and 542 may rotate around rotational centers 526 and 546, which may be installed on a subframe 800 connected to the vehicle body 200. More specifically, first ends of the connecting arms 522 and 542, which are connected to the wheels 120 and 140, may extend and to the rotational centers 526 and 546, respectively, and the second ends may extend from the rotational centers 526 and 546 to rotational joints 524 and 544, respectively and may be bent upward.

In an embodiment, the connecting first ends of the arms 522 and 542 may be connected to the suspensions 320 and 340, and as the wheels 120 and 140 and the suspensions 320 and 340 sequentially move up and down, may move up and down with respect to the rotational centers 526 and 546. In addition, the second ends, bent upward, may rotate in the left-right direction around vertical reference axes, respectively, and the rotational joints 524 and 544 at the second ends may move up and down in response to this left-right rotation.

In an embodiment, as described above, the motion of the converters 520/540 allows the connecting rods 600 to perform linear motion in the left-right direction. In this case, the connecting rods 600 are coupled to the converters 520/540 via heads 622 and 642 and screw-coupled to the rotational inertial element 700, thereby connecting the converters 520/540 to the rotational inertial element 700.

In an embodiment, the heads 622 and 642 are configured to connect the connecting rods 600 and the rotational joints 524 and 544, respectively, and may each be configured in the shape of a ball joint. The rotational joints described in this specification are merely exemplary, and various types of coupling means, such as bearings or brackets, may be applied as long as they can connect the connecting rods 600 and the connecting arms 522 and 542 and convert up-and-down motion into left-right motion. Similarly, the heads 622 and 642 are not limited to a ball joint configuration and may employ various types of coupling structures. The heads 622 and 642 may be configured as separate components from the connecting rods 600 or may be integrally molded.

In an embodiment, the heads 622 and 642 may perform left-right motion by sliding toward or away from the housing 820 in response to the linear motion of the converters 520/540. Specifically, as the up-and-down motion of the wheels is received through the connecting arms, the connecting arms 522 and 542 rotate in the left-right direction, and the rotational joints 524 and 544 move in the up-and-down direction, the heads 622 and 642 may move in the left-right direction. While being coupled with the rotational joints 524 and 544, the heads 622 and 642 may slide toward or away from the housing 820, allowing the connecting rods 600 to perform left-right motion.

In an embodiment, the connecting rods 600 may be screw-coupled to the rotational inertial element 700 using ball screw mechanisms, the heads 622 and 642 may receive the linear motion of the converters 520/540 and move left and right, and as the ball screws receive left-right motion and rotates, the rotational inertial element 700 may rotate. By using the ball screw mechanisms, linear motion may be easily converted into rotational motion, and as the converted rotational motion is transmitted to the rotational inertial element 700, the vibrations generated by the up-and-down motion of the wheels 120 and 140 may be effectively damped.

In an embodiment, the connecting rods 600 may be configured as a pair of dual rods. In this case, the pair of connecting rods 600 may be connected to the left and right sides of the rotational inertial element 700. Accordingly, the left connecting rod 600 may be positioned on the left side of the rotational inertial element 700 and connected to the left converter 520, while the right connecting rod 600 may be positioned on the right side of the rotational inertial element 700 and connected to the right converter 540.

In an embodiment, in the case of the dual-rod type, the left connecting rod 600 may be elastically supported by the left end of the housing 820 and may be inserted into the rotational inertial element 700 to be screw-coupled 622 to the rotational inertial element 700. Similarly, the right connecting rod 600 may be elastically supported by the right end of the housing 820, and the rotational inertial element 700 may be inserted into and screw-coupled 644 to the right connecting rod 600.

In an embodiment, the elastic support may be provided by coil springs. However, the coil springs are merely exemplary, and the elastic support may be achieved using various types of elastic support structures.

In an embodiment, the screw-coupling may be achieved through screw-coupled portions.

In another embodiment, the rotational inertial element 700 may include an insertion groove 720 on one side and a protrusion 740 on the other side. The rotational inertial element 700 may be coupled with screw-coupled portions 624 and 644 on both sides. For example, when the screw-coupled portions 624 and 644 are ball screws, the left screw-coupled portion 624 may be inserted into and engaged with the insertion groove 720 in the rotational inertial element 700, while the right screw-coupled portion 644 may be inserted into and engaged with the protrusion 740 of the rotational inertial element 700.

In an embodiment, the left connecting rod 620 and the right connecting rod 640 may be positioned in alignment with the rotational inertial element 700, and as the left connecting rod 620 (actually the screw coupled portion 624) or the right connecting rod 640 (actually the screw coupled portion 644) rotates, the rotational inertial element 700 may also rotate. Specifically, up-and-down vibrations generated by the left wheel 120 or the right wheel 140 may be converted into rotational motion, and the vibrations are damped by the rotational inertial element 700 and transmitted to the other side, thereby enabling the transmission of damped vibrations.

In an embodiment, the converters 520/540 may include a pair of connecting arms 522 and 542, which are respectively connected to the pair of suspensions 300 to receive vertical motion. The pair of connecting rods 620 and 640 connected to the pair of connecting arms 522 and 542 may be included to convert up-and-down motion into left-right motion, one or more connecting rods 620 and 640 may be provided. Screw-coupled portions 624 and 644 may be provided between the connecting rods 620 and 640 and the rotational inertial element 700, allowing the left-right motion converted through the connecting rods 620 and 640 to be further converted into rotational motion via the screw-coupled portions 624 and 644. The converted rotational motion may then be transmitted to and rotate the rotational inertial element 700.

In an embodiment, the screw-coupled portions 624 and 644 may be ball screws. Ball screws may convert linear motion into rotational motion and may also perform the reverse role. In the vibration control system of the present disclosure, screw-coupled portions 624 and 644 may be applied to transmit the rotational motion of the rotational inertial element 700 to the connecting rods 600 or to transmit the left-right motion of the connecting rods 620 and 640 to the rotational inertial element 700. More specifically, in the case of the screw-coupled portions 624 and 644 using the ball screw mechanisms, rolling balls between a fixed screw and a rotating nut may minimize friction and enable efficient force transmission. By using such screw-coupled portions 624 and 644, mechanical force or energy loss may be reduced, and precise motion control may be achieved. However, the ball screws described in this specification are merely an embodiment of the screw-coupled portions 624 and 644. Various types of screw-coupled portions 624 and 644 may be applied as long as they can connect the connecting rods 620 and 640 to the rotational inertial element 700 and convert linear motion into rotational motion, or vice versa.

In an embodiment, the connecting rods 620 and 640 may be connected to the screw-coupled portions 624 and 644 to convert the up-and-down motion transmitted from the wheels 100 or the suspensions 300 into rotational motion. The connecting rods 620 and 640 may absorb various vibrations generated by the up-and-down motion of the suspensions 300, convert the vibrations into left-right motion, and transmit this motion to the screw-coupled portions 624 and 644. Alternatively, rotational motion received from the screw-coupled portions 624 and 644 may be converted into linear motion and transmitted to the vehicle body.

In an embodiment, the connecting arms 522 and 542 may connect the connecting rods 620 and 640 to the suspensions 300. When the suspensions 300 receives forces in up-and-down direction from the wheels 100, these forces may be transmitted to the connecting rods 620 and 640 through the suspensions 300. The connecting rods 620 and 640 and the connecting arms 522 and 542 may be connected via the rotational joints 524 and 544, respectively. Therefore, the rotational joints 524 and 544 may be used to convert the up-and-down motion of the connecting arms 522 and 542 into left-right motion of the connecting rods 620 and 640.

In an embodiment, the suspensions 300 may include upper links 322 and 342 and lower links 324 and 344, respectively. The upper links 322 and 342 may be connected to the vehicle body 200, while the lower links 324 and 344 may be connected to the wheels 100. In this case, the up-and-down vibrations caused by the movement of the wheels 100 can be damped by the rotational inertial element 700 before being transmitted to the vehicle body 200. In addition, the rotational inertial element 700 can receive rotational motion from the screw-coupled portions 624 and 644 and rotate, thereby damping the up-and-down vibrations. The vibrations damped by the rotational inertial element 700 may then be transmitted to the vehicle body 200 through the upper links 322 and 342.

In an embodiment, the up-and-down motion of the wheels 100 transmitted through the suspensions 300 may be transmitted to the connecting rods 620 and 640 via the connecting arms 522 and 542, and the connecting rods 620 and 640 may convert this up-and-down motion into left-right motion. The force converted into left-right motion through the connecting rods 620 and 640 may be further converted into rotational motion by the screw-coupled portions 624 and 644 to be transmitted to the rotational inertial element 700, and as the rotational inertial element 700 rotates, high-frequency vibrations may be damped. As the damped vibrations are sequentially transmitted to the vehicle body 200 through the screw-coupled portions 624 and 644, the connecting rods 620 and 640, and the connecting arms 522 and 542, and then through the upper links 322 and 342 of the suspensions 300, the damped vibrations may be applied to the vehicle body 200.

In an embodiment, one sides of the connecting arms 522 and 542 may be connected to the connecting rods 620 and 640 and the rotational joints 524 and 544, and through the rotational joints 524 and 544, the up-and-down motion of the connecting arms 522 and 542 may be converted into left-right motion of the connecting rods 620 and 640. Of course, the rotational joints 524 and 544 may serve as means to convert up-and-down motion into left-right motion. In addition to rotational joints 524 and 544, various other conversion mechanisms, such as sliding joints, gear systems, hydraulic housings, spring-rotor systems, cam systems, ball-nut systems, chain drive systems, or power-train systems, may also be applied.

Next, with reference to FIGS. 3 to 6, the operation of the connecting rods 620 and 640 in a dual-rod-type vibration control system of the present disclosure during the bump or rebound of both suspensions 300 will be described.

In an embodiment, multiple connecting rods 620 and 640 may be provided, and these multiple connecting rods 620 and 640 may be connected to opposite sides of the rotational inertial element 700 via the screw-coupled portions 624 and 644, respectively. Meanwhile, a pair of suspensions 300 may be coupled to a subframe 800 connected to the vehicle body 200. A housing 820 may be provided within the subframe 800, and the rotational inertial element 700 may be installed inside the housing 820. The connecting rods 600 may extend through the housing 820 to be connected to the pair of suspensions 300, respectively.

In an embodiment, the left connecting rod 620 and the right connecting rod 640 may be coupled to the opposite sides of the rotational inertial element 700. The rotational inertial element 700 may be fixed within the housing 820 using a sliding member 840, allowing the left connecting rod 624 and the right connecting rod 540 to be individually rotated by the rotational inertial element 700. For example, in an independent suspension structure, up-and-down vibrations generated by the left wheel 120 may be transmitted to the rotational inertial element 700 via the left converter 520 and the left connecting rod 600. The rotational inertial element 700 may damp the vibrations, which are then transmitted to the vehicle body 200 via the right converter 540 and the right connecting rod 640.

In an embodiment, the configuration of enabling the independent rotation of the left connection rod 620 and the right connection rod 640 may be a sliding member 840 that fixes the rotational inertial element 700 inside the housing 820. For example, the sliding member 840 may be a sliding bearing. However, the sliding bearing is merely one example of the sliding member 840, and various coupling means such as ball bearings, roller bearings, hydraulic housings, linear motors, or magnetic bearings may be applied as long as the left converter 520 and the right converter 540 can rotate independently relative to the rotational inertial element 700.

In an embodiment, the left suspension 320 or the right suspension 340 may undergo a bump or a rebound. The term “bump” may refer to the motion in which the suspensions 300 are compressed, while the term “rebound” may refer to the motion in which the suspensions 300 extend back to their original positions after being compressed.

In an embodiment, when the left suspension 320 or the right suspension 340 undergoes a bump, the connecting rod 600 may move closer to the rotational inertial element 700, and when the left suspension 320 or the right suspension 340 undergoes a rebound, the connecting rod 600 may move away from the rotational inertial element 700.

In an embodiment, when the vehicle turns left, the left suspension 320 may undergo a rebound, and the right suspension 340 may undergo a bump, causing the left connecting rod 620 to move away from the rotational inertial element 700 and the right connecting rod 640 to move closer to the rotational inertial element 700. Similarly, when the vehicle turns right, the left suspension 320 may undergo a bump, and the right suspension 340 may undergo a rebound, causing the left connecting rod 620 to move closer to the rotational inertial element 700 and the right connecting rod 640 to move away from the rotational inertial element 700.

Figure 3:
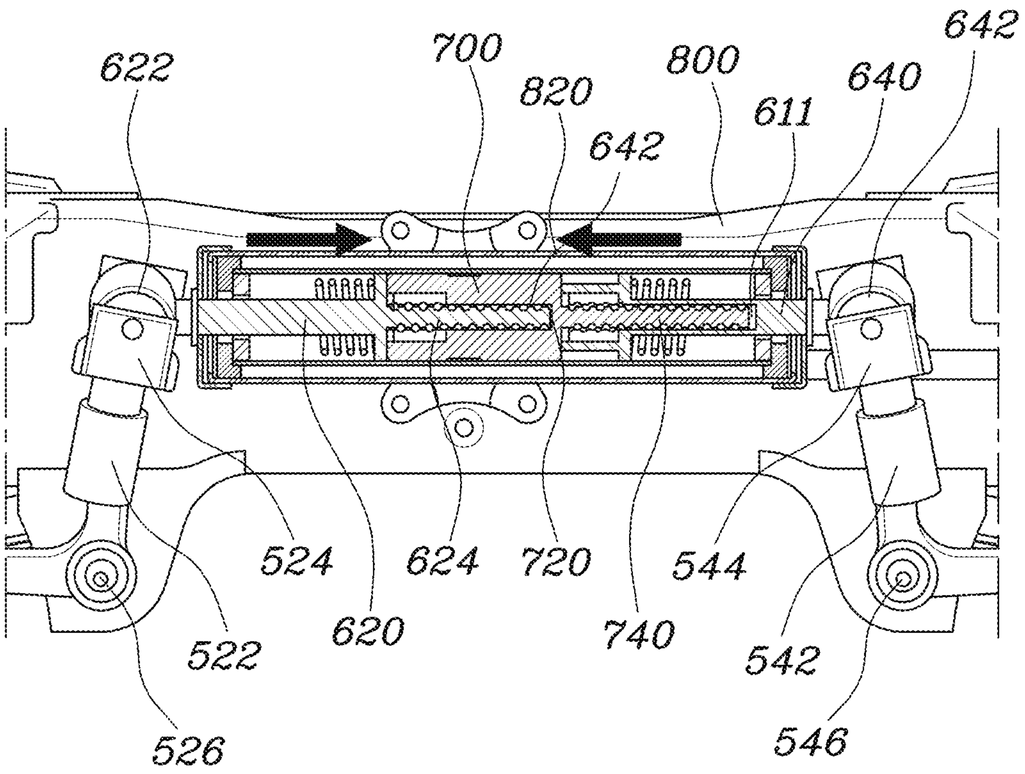
FIGS. 3 to 6 are views illustrating the operational states of the dual-rod type vibration control system illustrated in FIG. 1 in response to a suspension's bump or rebound according to an embodiment of the present disclosure.
Figure 4:
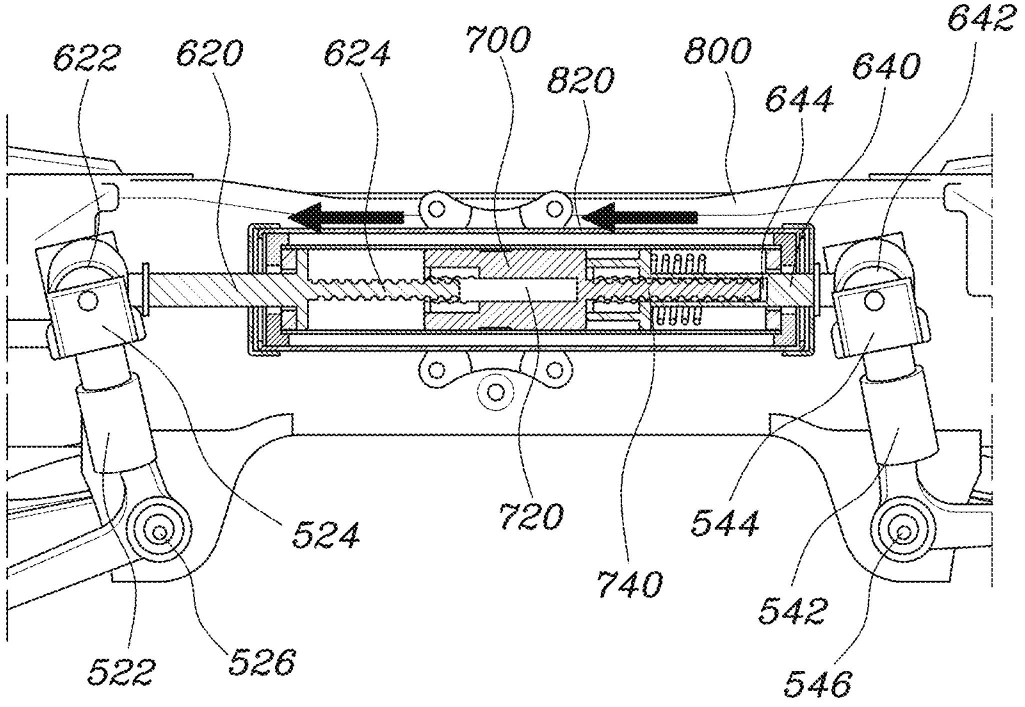
Figure 5:
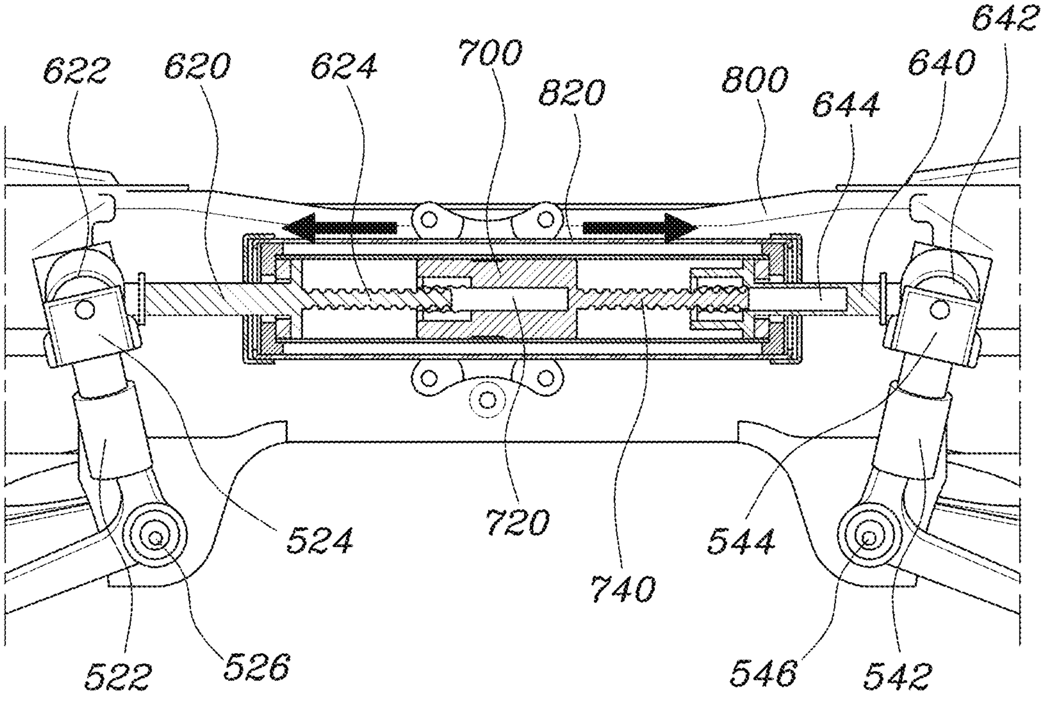
Figure 6:
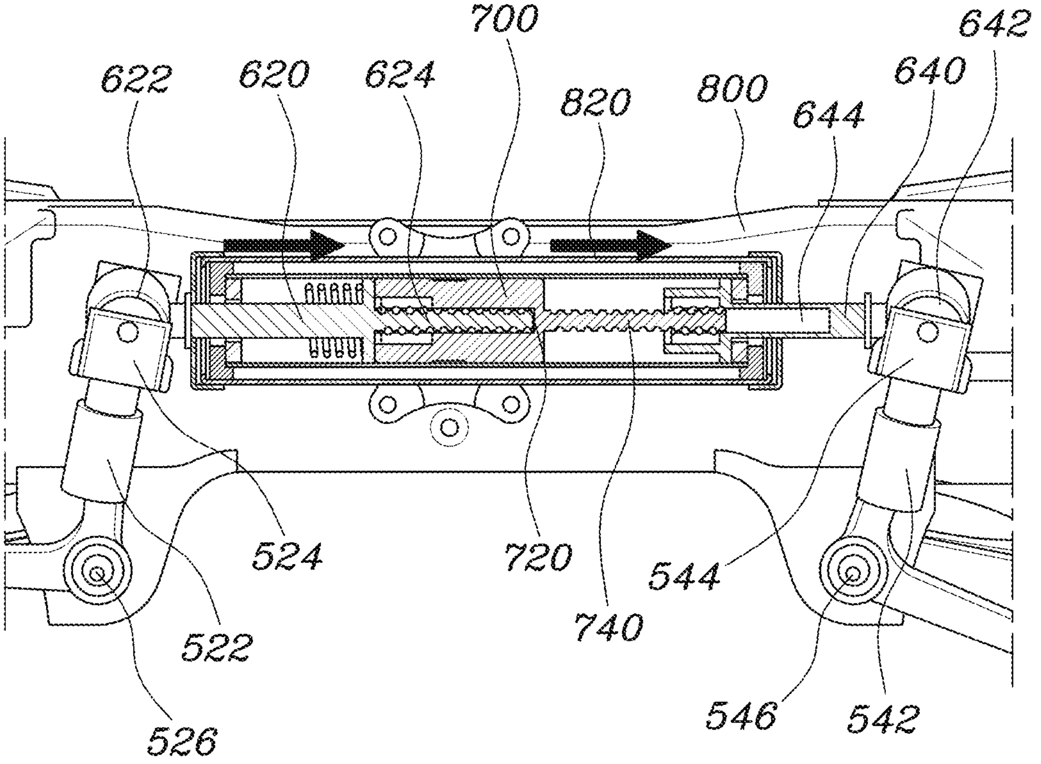

In an embodiment, FIG. 3 may illustrate a case where both the left suspension 320 and the right suspension 340 undergo a bump simultaneously, and FIG. 4 may illustrate a case where the vehicle turns left, causing the left suspension 320 to undergo a rebound and the right suspension 340 to undergo a bump. In addition, FIG. 5 may illustrate a case where both the left suspension 320 and the right suspension 340 undergo a rebound simultaneously, and FIG. 6 may illustrate a case where the vehicle turns right, causing the left suspension 320 to undergo a bump and the right suspension 340 to undergo a rebound.

With reference to FIGS. 7 to 11, the operation of the connecting rods 620 and 640 in a single-rod-type vibration control system of the present disclosure during the bump or rebound of both suspensions 300 will be described.

In an embodiment, the single-rod-type vibration control system may be configured by two screw-coupled portions 624 and 644 separated from each other, enabling higher pitch adjustment and design flexibility, which may make it more effective in achieving high rotational speeds compared to a dual-rod-type vibration control system. Accordingly, a single-rod-type vibration control system may be applied to effectively manifest the mass effect of an inerter system.

In an embodiment, the single-rod-type vibration control system may include a single connecting rod 620 or 640. The connecting rod may be connected to either the left converter 520 or the right converter 540, while the rotational inertial element 700 may have one side engaged with the connecting rod 640, via the screw-coupled portion, 644, and the other side connected to the converter 520.

In an embodiment, the rotational inertial element 700 may be coupled to the converter 520 via a head 622 on the other side. As the head 622 slides closer to or away from the housing, the rotational inertial element 700 may move closer to or away from the connecting rod 640.

In an embodiment, the rotational inertial element 700 may have one side connected to the connecting rod 620 or 640 via the screw-coupled portion 624 or 644 and the other side coupled to a connecting arm 522 or 542. FIGS. 7 to 11 illustrate a case where the connecting rod 620 or 640 is applied on the right side. However, this is merely exemplary, and the single rod may be applied in various directions, such as the left or right side, depending on design requirements.

In an embodiment, the rotational inertial element 700 and the screw-coupled portion 624 or 644 may be bolted together, and the connecting arm 522 or 542 of the rotational inertial element 700 may be coupled via a bearing 860. In this case, the bearing 860 may be a needle bearing 860. Unlike the dual-rod-type vibration control system, the single-rod-type vibration control system uses a single connecting rod 620 or 640, allowing the rotational inertial element 700 to be directly coupled to the connecting arms 522 and 542. To allow the rotational inertial element 700 to be directly coupled to the connecting arms 522 and 542, a needle bearing 860 may be applied. Through this, as the rotational inertial element 700 rotates due to the rotation of the screw-coupled portion 624 or 644, the damped vibrations may be transmitted to the suspensions 300 via the connecting arms 522 and 542.

In an embodiment, the left suspension 320 or the right suspension 340 may undergo a bump or a rebound. The term "bump" may refer to the motion in which the suspensions 300 are compressed, while the term "rebound" may refer to the motion in which the suspensions 300 extend back to their original position after being compressed.

In an embodiment, when the left suspension 320 or the right suspension 340 undergoes a bump, the rotational inertial element 700 and the connecting rods 620 and 640 may move closer to each other. Conversely, when the left suspension 320 or the right suspension 340 undergoes a rebound, the rotational inertial element 700 and the connecting rods 620 and 640 may move away from each other.

In an embodiment, when the vehicle turns left, the left suspension 320 may undergo a rebound, and the right suspension 340 may undergo a bump, causing the rotational inertial element 700 and the connecting rods 600 to move leftward. When the vehicle turns right, the left suspension 320 may undergo a bump, and the right suspension 340 may undergo a rebound, causing the rotational inertial element 700 and the connecting rods 600 to move rightward.

In an embodiment, for example, in the case where the rotational inertial element 700 is provided on the left side of the housing 820, when the vehicle turns left, the left suspension 320 may undergo a rebound, and the right suspension 340 may undergo a bump. As a result, the rotational inertial element 700 may move away from the connecting rods 620 and 640, while the connecting rods 620 and 640 may move closer to the rotational inertial element 700. Similarly, when the vehicle turns right, the left suspension 320 may undergo a bump, and the right suspension 340 may undergo a rebound. As a result, the rotational inertial element 700 may move closer to the connecting rods 620 and 640, while the connecting rods 620 and 640 may move away from the rotational inertial element 700.

Figure 8:
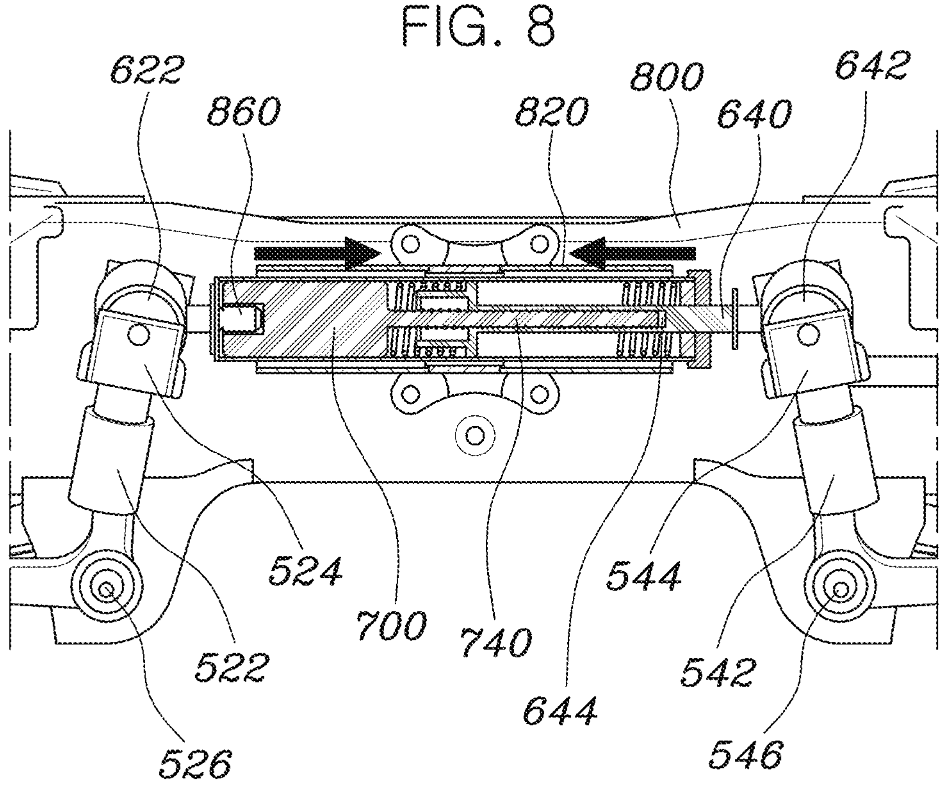
FIGS. 8 to 11 are views illustrating the operational states of the single-rod type vibration control system illustrated in FIG. 7 in response to a suspension's bump or rebound according to an embodiment of the present disclosure.
Figure 9:
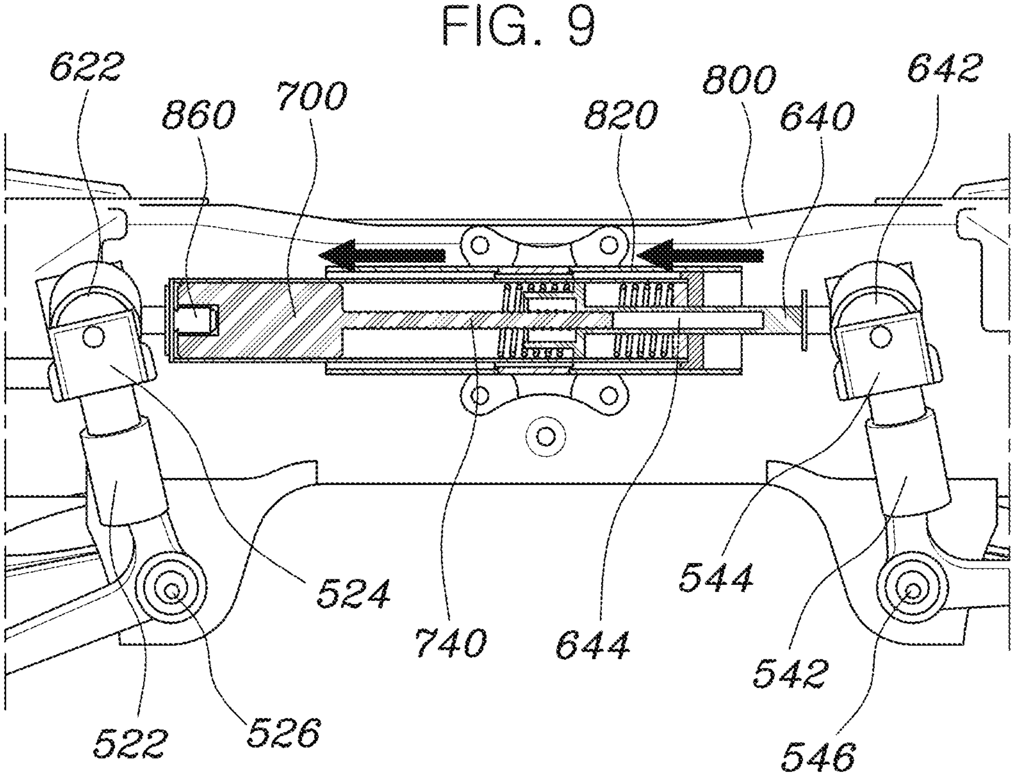
Figure 10:
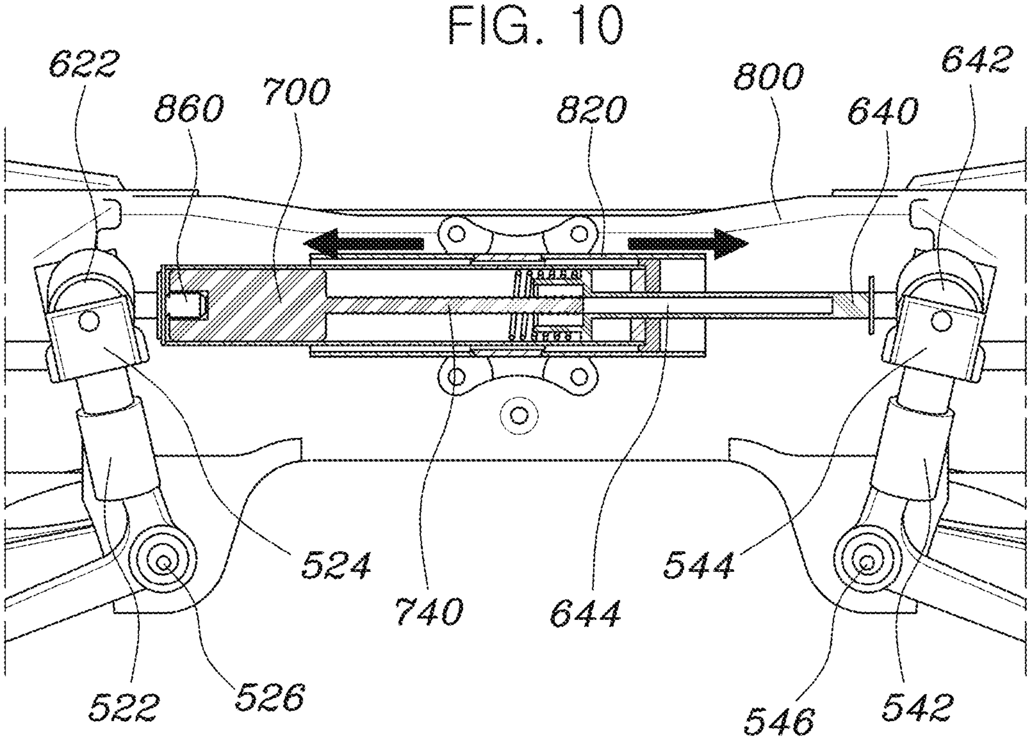
Figure 11:
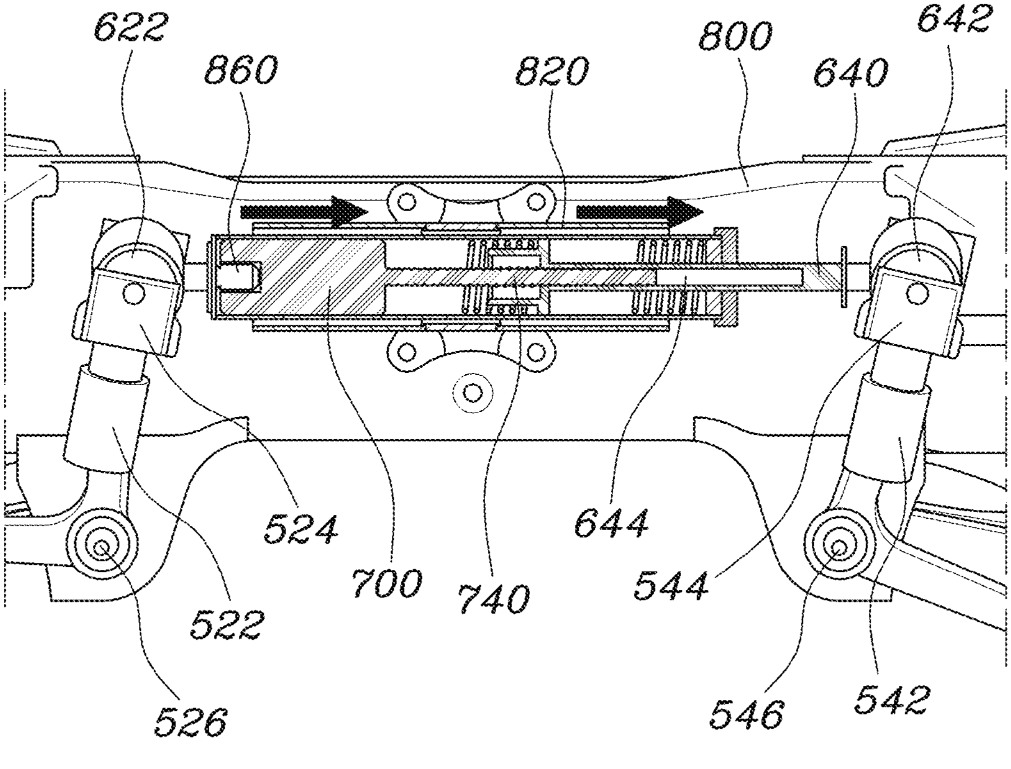

In an embodiment, FIG. 8 may illustrate a case where both the left suspension 320 and the right suspension 340 undergo a bump simultaneously, and FIG. 9 may illustrate a case where the vehicle turns left, causing the left suspension 320 to undergo a rebound and the right suspension 340 to undergo a bump. In addition, FIG. 10 may illustrate a case where both the left suspension 320 and the right suspension 340 undergo a rebound simultaneously, and FIG. 11 may illustrate a case where the vehicle turns right, causing the left suspension 320 to undergo a bump and the right suspension 340 to undergo a rebound.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A vibration control system comprising:

a housing disposable between left and right wheels and a rotational inertial element configured to rotate within the housing;

a pair of converters connectable to the left and right wheels, respectively, and configured to convert an up-and-down motion of the left and right wheels into a linear motion; and connecting rods connecting the pair of converters to the rotational inertial element and configured to convert the linear motion of the converters into a rotational motion of the rotational inertial element, wherein the connecting rods comprise a pair of connecting rods, wherein a left connecting rod is connected to a left converter of the pair of converters, and a right connecting rod is connected to a right converter of the pair of converters, wherein the left connecting rod and the right connecting rod are configured to perform linear motions relative to each other, and wherein the rotational inertial element is independently rotatable according to the linear motion of the left connecting rod and the linear motion of the right connecting rod.

2. The vibration control system of claim 1, wherein the connecting rods are coupled to the converters via heads, respectively, and wherein the connecting rods are screw-coupled to the rotational inertial element to connect the pair of converters and the rotational inertial element.

3. The vibration control system of claim 2, wherein the connecting rods are screw-coupled to the rotational inertial element via a ball screw mechanism, wherein the heads are configured to perform a left-right motion in response to the linear motion of the pair of converters, and wherein the rotational inertial element is configured to rotate when the ball screw mechanism rotates in response to the left-right motion of the pair of converters.

4. The vibration control system of claim 1, wherein the left connecting rod is positioned on a left side of the rotational inertial element, and wherein the right connecting rod is positioned on a right side of the rotational inertial element.

5. The vibration control system of claim 4, wherein the left connecting rod is elastically supported by a left end of the housing and is inserted into and screw-coupled to the rotational inertial element.

6. The vibration control system of claim 4, wherein the right connecting rod is elastically supported by a right end of the housing, and the rotational inertial element is inserted into and screw-coupled to the right connecting rod.

7. The vibration control system of claim 4, wherein the left connecting rod and the right connecting rod are aligned with the rotational inertial element, and wherein the rotational inertial element is configured to rotate based on a rotational motion of the left connecting rod or the right connecting rod.

8. The vibration control system of claim 4, wherein the rotational inertial element is fixed to the housing via a slider, and wherein the left connecting rod and the right connecting rod are configured to rotate independently relative to the rotational inertial element.

9. A vehicle comprising:

left and right wheels; and a vibration control system comprising:

a housing disposed between the left and right wheels and a rotational inertial element configured to rotate within the housing;

a pair of converters connected to the left and right wheels, respectively, and configured to convert an up-and-down motion of the left and right wheels into a linear motion; and connecting rods connecting the pair of converters to the rotational inertial element and configured to convert the linear motion of the pair of converters into a rotational motion of the rotational inertial element, wherein the connecting rods comprise a pair of connecting rods, wherein a left connecting rod is connected to a left converter of the pair of converters, and a right connecting rod is connected to a right converter of the pair of converters, wherein the left connecting rod and the right connecting rod are configured to perform linear motions relative to each other, and wherein the rotational inertial element is independently rotatable according to the linear motion of the left connecting rod and the linear motion of the right connecting rod.

10. The vehicle of claim 9, further comprising:

a vehicle body; and a subframe connected to the vehicle body, wherein the housing is installed on the subframe.

11. The vehicle of claim 10, wherein each of the pair of converters comprises a connecting arm configured to rotate in a left-right direction and a rotational joint coupled to the connecting arm and configured to move up and down, wherein the connecting arm is configured to rotate about a rotational center, and wherein the rotational center is on the subframe.

12. The vehicle of claim 11, wherein one end of the connecting arm extends from the rotational center to the left and right wheels, respectively, and wherein another end of the connecting arm extends from the rotational center upward to the rotational joint.

13. The vehicle of claim 12, wherein the one end is configured to move up and down, wherein the other end is configured to move in a left-right direction, and wherein the rotational joint is configured to move up and down in response to a movement of the other end in the left-right direction.

14. The vehicle of claim 9, wherein the left and right wheels are connected to suspensions, respectively, wherein the connecting rods are configured to move toward the rotational inertial element based on the suspensions responding to a bump, and wherein the connecting rods are configured to move away from the rotational inertial element based on the suspensions rebounding from the bump.

15. The vehicle of claim 9, wherein the left connecting rod is configured to move away from the rotational inertial element and the right connecting rod is configured to move toward the rotational inertial element based on a left turn of the vehicle, and wherein the left connecting rod is configured to move towards the rotational inertial element and the right connecting rod is configured to move away from the rotational inertial element based on a right turn of the vehicle.

16. The vehicle of claim 9, wherein the rotational inertial element and the connecting rods are configured to move toward the left based on a left suspension rebounding from a first bump and a right suspension responding to a second bump and based on the vehicle turning left, and wherein the rotational inertial element and the connecting rods are configured to move toward a right based on the left suspension responding to the first bump and the right suspension rebounding from the second bump and based on the vehicle turning right.

17. A vibration control system comprising:

a housing disposable between left and right wheels and a rotational inertial element configured to rotate within the housing;

a pair of converters connectable to the left and right wheels, respectively, and configured to convert an up-and-down motion of the left and right wheels into a linear motion; and a single connecting rod connected to one of the converters, wherein the rotational inertial element is connected between the single connecting rod and another one of the converters, wherein the rotational inertial element is connected to one of the pair of converters through the single connecting rod, wherein the rotational inertial element is connected to the other one of the pair of converters through a head portion of the rotational inertial element, wherein the rotational inertial element is independently rotatable according to a linear motion of the single connecting rod or a sliding motion of the head portion, wherein the left and right wheels are connected to suspensions, respectively, wherein the rotational inertial element and the single connecting rod are configured to move closer to each other based on the suspensions responding to a bump, and wherein the rotational inertial element and the single connecting rod are configured to move away from each other based on the suspensions rebounding from the bump.

18. The vibration control system of claim 17, wherein the rotational inertial element is coupled to the single connecting rod via a ball screw.

19. The vibration control system of claim 17, wherein the rotational inertial element is fixed to the housing via a slider.

20. The vibration control system of claim 17, wherein the rotational inertial element is directly coupled to the converter via a bearing.

* * * * *